United States Patent [19]
Estigoy et al.

[11] Patent Number: 4,965,998
[45] Date of Patent: Oct. 30, 1990

[54] MINI HYDRO ELECTRIC PLANT

[76] Inventors: Filemon E. Estigoy, C.R.V. P.O. Box 17141, Jeddah 21484 K.S.A., Philippines; George Spector, 233 Broadway 3815, New York, N.Y. 10007

[21] Appl. No.: 312,481
[22] Filed: Feb. 21, 1989
[51] Int. Cl.$^5$ .............................................. F16D 31/00
[52] U.S. Cl. ........................................ 60/325; 60/435; 290/43
[58] Field of Search ...................... 290/43, 54; 60/398, 60/394, 325, 435; 417/223, 316, 15

[56] References Cited
U.S. PATENT DOCUMENTS

| | | | |
|---|---|---|---|
| 1,947,808 | 2/1934 | Spellman | 60/398 |
| 3,028,727 | 4/1962 | Anston | 417/399 X |
| 3,205,969 | 9/1965 | Clark | 60/398 X |
| 3,730,646 | 5/1973 | Affri et al. | 417/80 X |
| 4,001,597 | 1/1977 | Graff | 60/398 X |
| 4,206,608 | 6/1980 | Bell | 60/398 X |
| 4,246,753 | 1/1981 | Redmon | 290/43 X |
| 4,408,127 | 10/1983 | Santos | 290/43 X |

FOREIGN PATENT DOCUMENTS 2400119  4/1979  France .................................. 60/325

OTHER PUBLICATIONS

Gasoline Alley comic, Washington Post, Sep. 7, 1930, copy in 60/325.

Primary Examiner—Edward K. Look

[57] ABSTRACT

A mini hydroelectric power plant is provided that utilizes a water driven turbine to drive an electric generator for producing electricity. Flowing water is collected from the turbine and pumped back to a reservoir to be used again for driving the turbine.

1 Claim, 1 Drawing Sheet

MINI HYDRO ELECTRIC PLANT

BACKGROUND OF THE INVENTION

The instant invention relates generally to electrical generator systems and more specifically it relates to a mini hydroelectric power plant.

Numerous electrical generator systems have been provided in prior art that are adapted to be driven by the flow of water therethrough. For example, U.S. Pat. Nos. 3,984,698; 4,241,283 and 4,636,141 all are illustrative of such prior art. While these units may be suitable for the particular purpose to which they address, they would not be as suitable for the purposes of the present invention as heretofore described.

SUMMARY OF THE INVENTION

A primary object of the present invention is to provide a mini hydroelectric power plant that will overcome the shortcomings of the prior art devices.

Another object is to provide a mini hydroelectric power plant that utilizes a water driven turbine to drive an electric generator for producing electricity.

An additional object is to provide a mini hydroelectric power plant in which flowing water is colled from the turbine and pumped back to a reservoir to be used again for driving the turbine.

A further object is to provide a mini hydroelectric power plant that is simple and easy to use.

A still further object is to provide a mini hydroelectric power plant that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
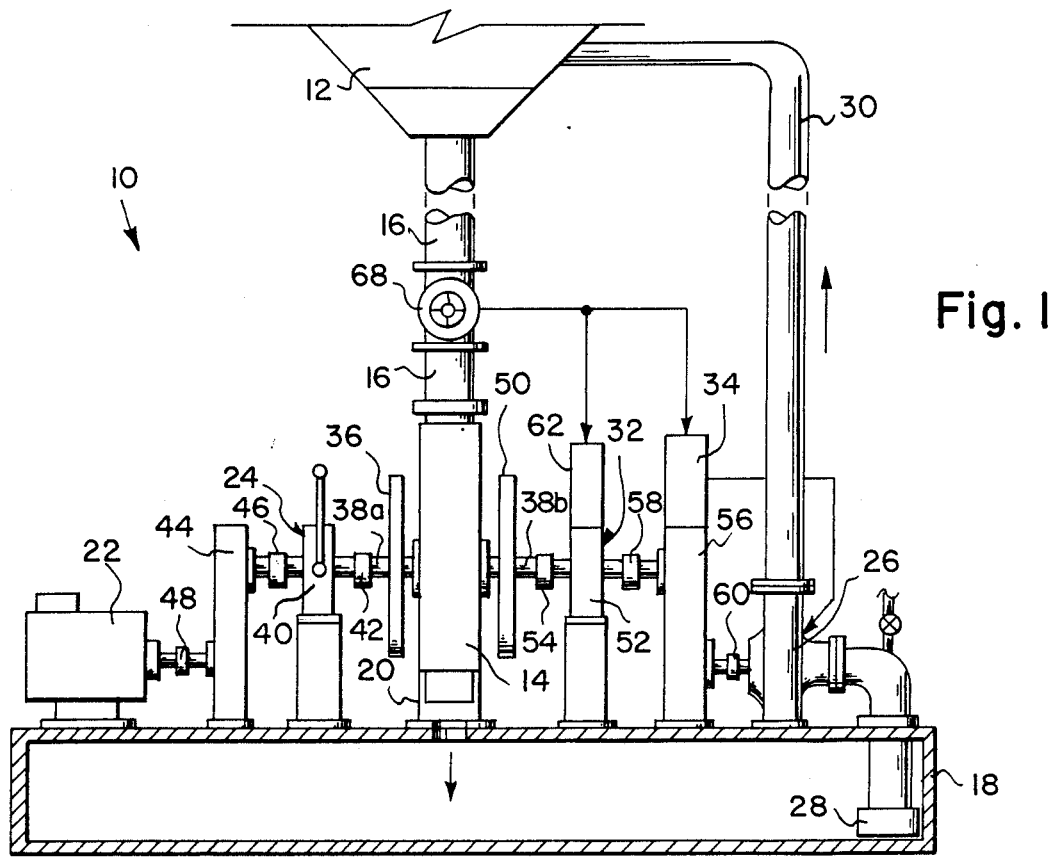
FIG. 1 is a front elevational view of the invention partly in section and partly broken away.
Figure 2:
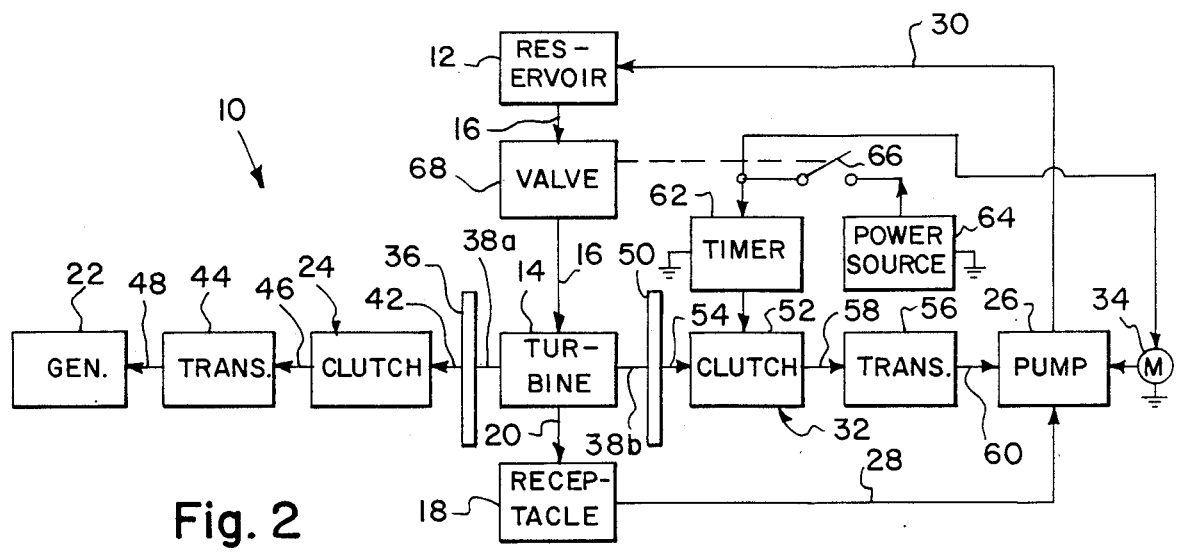
FIG. 2 is a block diagram relating to FIG. 1, showing actuation of the generator by a turbine and simultaneously periodic actuation of a pump in combination with an externally powered motor also activiting the pump wherein a timer and a power source are electrically connected by a valve turned to an open position.

Turning now descriptively to the drawings, in which similar reference characters denote similar elements throughout the several views, FIGS. 1 and 2 illustrate a mini hydroelectric power plant 10. A reservoir 12 is for holding water therein while a water driven turbine 14 is in fluid communication via pipe 16, with the reservoir 12, so that the water flowing into the turbine 14 from the reservoir 12 will operate the turbine 14. A receptacle 18 is in fluid communication via pipe 20 with the turbine 14 for collecting the water flowing out of the turbine 14.

An electric generator 22 is provided for producing electric power whereby a first driving mechanism 24 is connected between the turbine 14 and the electric generator 22 to drive the same.

A pump 26 is in fluid communication between the receptacle 18 via a foot valve 28 and the reservoir 12 via a return pipe 30. A second driving mechanism 32 is connected between the turbine 14 and the pump 26 to dirve the same. An externally powered motor 34 is electrically connected to the pump 26 for assisting the pump 26 in pumping the water out of the receptacle 18 and back into the reservoir 12 so that the water can be used again for operating the turbine 14.

The first driving mechanism 24 includes a first flywheel 36 affixed to a first extending portion 38a of a shaft from the turbine 14. A first clutch 40 is coupled at 42 onto the first extending portion 38a of the shaft from the turbine 14. A first transmission assembly 44 is coupled between the first clutch 40 at 46 and the generator 22 at 48.

The second driving mechanism 32 includes a second flywheel 50 affixed to a second extending portion 38b of the shaft from the turbine 14. A second clutch 52 is coupled at 54 onto the second extending portion 38b of the shaft from the turbine 14. A second transmission assembly 56 is coupled between the second clutch 52 at 58 and the pump 26 at 60.

A timer 62 is electrically connected to the second clutch 52 for periodic operation of the second clutch 52. A power source 64, such as a battery or house current, is for supplying electrical current to the timer 62 and the motor 34. A switch 66 is electrically disposed between the power source 64, the timer 62 and the motor 34.

A manually operated valve 68 is disposed in fluid communication between the reservoir 12 and the turbine 14 in pipe 16. The valve 68 is mechanically connected to the switch 66 so that when the valve 68 is opened the switch 66 will close causing the power source 64 to supply electrical current to the timer 62 and the motor 34.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A mini hydroelectric power plant which comprises:
   (a) a reservoir for holding water therein;
   (b) a water driven turbine in fluid communication with said reservoir so that the water flowing into said turbine from said reservoir will operate said turbine;
   (c) a receptacle in fluid communication with said turbine for collection the water flowing out of said turbine;
   (d) an electric generator for producing electric power;
   (e) a first driving means connected between said turbine and said electric generator to drive the same;
   (f) a pump in fluid communication between said receptacle and said reservoir;
   (g) a second driving means connected between said turbine and said pump to drive the same;
   (h) an externally powered motor electrically connected to said pump for assisting said pump in pumping the water out of said receptacle and back into said reservoir so that the water can be used again for operating said turbine; wherein said first driving means includes;

(i) a first flywheel affixed to a first extending portion of a shaft from said turbine;

(j) a first clutch coupled onto said first extending portion of said shaft from said turbine;

(k) a first transmission assembly coupled between said first clutch and said generator; wherein said second driving means includes:

(l) a second flywheel affixed to a second extending portion of said shaft from said turbine;

(m) a second clutch coupled onto said second extending portion of said shaft from said turbine;

(n) a second transmission assembly coupled between said second clutch and said pump; said power plant further comprising:

(o) a timer electrically connected to said second clutch for periodic operation of said second clutch;

(p) a power source for supplying electrical current to said timer and said motor;

(q) a switch electrically disposed between said power source, and timer and said motor, and (r) a manually operated valve disposed in fluid communication between said reservoir and said turbine, said valve mechanically connected to said switch so that when said valve is opened said switch will close causing said power source to supply electrical current to said timer and said motor.

* * * * *